(12) United States Patent
Matsuyama

(10) Patent No.: US 6,412,059 B1
(45) Date of Patent: Jun. 25, 2002

(54) METHOD AND DEVICE FOR CONTROLLING CACHE MEMORY

(75) Inventor: Hideki Matsuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/409,881

(22) Filed: Oct. 1, 1999

(30) Foreign Application Priority Data

Oct. 2, 1998 (JP) ............................................. 10-281843

(51) Int. Cl.[7] .............................................. G06F 12/00
(52) U.S. Cl. ......................... 711/204; 711/137; 711/213
(58) Field of Search ................................ 711/204, 213, 711/3, 137

(56) References Cited

U.S. PATENT DOCUMENTS

| | | | | |
|---|---|---|---|---|
| 5,394,530 A | * | 2/1995 | Kitta ............................. | 395/375 |
| 5,499,355 A | * | 3/1996 | Krishnamohan et al. .... | 395/464 |
| 5,553,255 A | * | 9/1996 | Jain et al. ..................... | 395/375 |
| 5,627,988 A | | 5/1997 | Oldfield ....................... | 395/428 |
| 5,732,242 A | * | 3/1998 | Mowry ........................ | 711/122 |
| 5,737,550 A | * | 4/1998 | Song ............................. | 710/52 |
| 5,740,416 A | * | 4/1998 | McMahan .................... | 395/585 |
| 5,802,566 A | * | 9/1998 | Hagersten .................... | 711/137 |
| 5,809,529 A | * | 9/1998 | Mayfield ..................... | 711/137 |
| 5,953,512 A | * | 9/1999 | Cai et al. ..................... | 395/381 |
| 5,956,746 A | * | 9/1999 | Wang .......................... | 711/137 |
| 6,078,996 A | * | 6/2000 | Hagersten .................... | 711/137 |
| 6,101,577 A | * | 8/2000 | Tran ............................. | 711/125 |
| 6,134,633 A | * | 10/2000 | Jacobs ......................... | 711/137 |

FOREIGN PATENT DOCUMENTS

| | | | | |
|---|---|---|---|---|
| JP | 4-160543 | 6/1992 | ............ | G06F/12/08 |
| JP | 4-267466 | 9/1992 | ............ | G06F/12/08 |
| JP | 8-185355 | 7/1996 | ............ | G06F/12/08 |
| JP | 10-12433 | 5/1998 | ............. | G06F/9/38 |

OTHER PUBLICATIONS

Barry Fagin, "Partial Resolution in Branch Target Buffers," IEEE Transactions on Computers, vol. 46 Issue: 10, Oct. 1997, pp. 1142–1145.*

* cited by examiner

Primary Examiner—Matthew M. Kim
Assistant Examiner—Stephen Elmore
(74) Attorney, Agent, or Firm—Foley & Lardner

(57) ABSTRACT

In order to immediately respond to an access request from a processor with reduced power consumption, a requested information is read out from a cache memory 31 or information buffers $42_1$ to $42_1$ and supplied to the processor when comparators $34_3$ to $34_{10}$ output hit signals. The cache memory control method performs a first processing to read the tag from the tag memories $32_1$ and $32_2$ and temporarily store it in the tag buffers $35_1$ and $35_2$ when there is no hit signal output therefrom, performs a second processing to read the information from the cache memory 31 and supply it to the processor when a hit signal is output from the comparators $34_3$ to $34_2$ and to read the information from the main memory on the basis of the address signal AD, temporarily store the information in the information buffers $42_1$ to $42_4$ and the cache memory 31 and temporarily store the address of the information temporarily stored in the information buffers $42_1$ to $42_1$ in the backup buffer 39 when there is no hit signal output from the comparators $34_3$ to $34_2$.

17 Claims, 9 Drawing Sheets

A for a=0 to 10

B for b=0 to 11

C for c=0 to 12

D for d=0 to 13

E next d

F next c

G next b

H next a

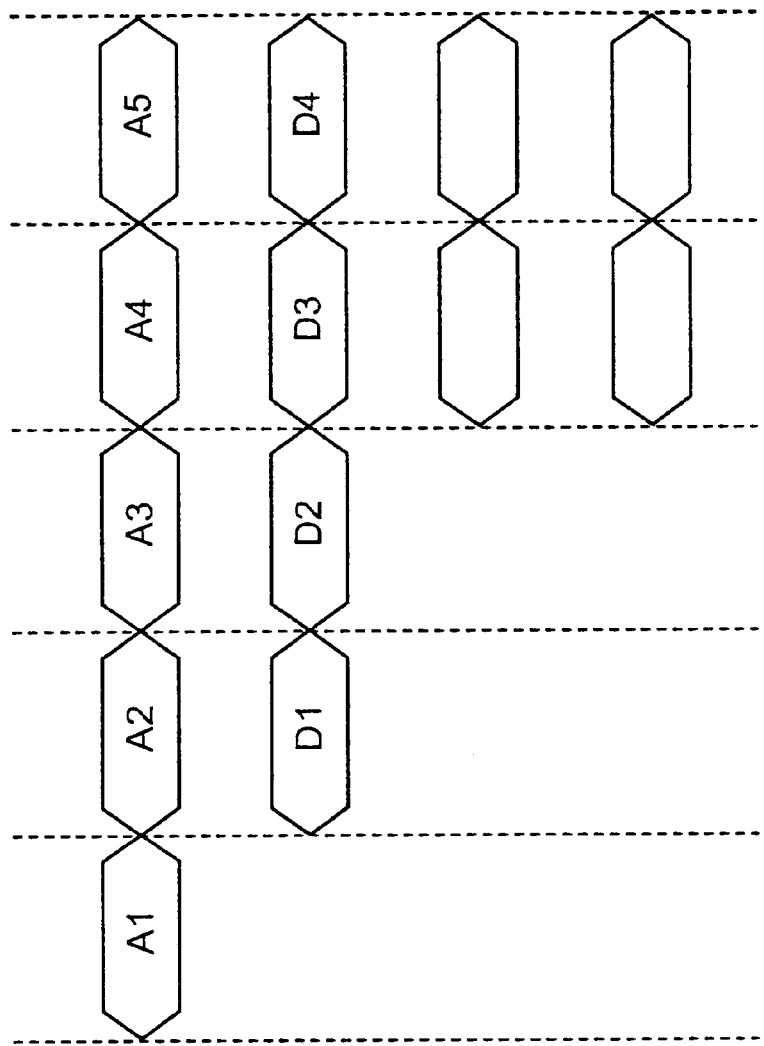

METHOD AND DEVICE FOR CONTROLLING CACHE MEMORY

BACKGROUND OF THE INVENTION

1. Field of the Invention

The present invention relates to a method and device for controlling a cache memory and, particularly, to a method and device for controlling a cache memory, in such a way that an information such as instructions and/or data, etc., which is requested by a processor, is read out from a cache memory or a main memory and supplied to the processor.

2. Description of Related Art

FIG. 9 is a block circuit diagram showing an example of an electrical construction of a main portion of a data processor to which a conventional cache memory control device is applied.

The data processor shown in FIG. 9 is constructed with, mainly, a processor 1, a cache memory control device 2 and a main memory device 3. The cache memory control device 2 is constructed with, mainly, a cache memory 4, a tag memory 5, an address generator circuit 6, a comparator 7, buffers 8 to 11, an LRU (Least Recently Used) information generator circuit 12 and an LRU memory 13.

The processor 1 performs a data processing by controlling various portions of the data processor. The cache memory control device 2 reads out an information such as instructions and/or data, etc., which is requested by the processor 1, from the cache memory 4 or the main memory device 3, as occasion demands, and supplies the information thus read out to the processor 1. The information such as instructions and/or data, etc., which are necessary for the processor 1 to perform a data processing, is stored in the main memory device 3.

The cache memory 4 temporarily stores the information such as instructions and/or data, etc., which is read out from the main memory device 3. In order to search the information stored in the cache memory 4, the tag memory 5 stores a tag, which is a portion of an address of the information. The address generator circuit 6 generates an address necessary to read the information, to which the processor 1 requests an access, from the main memory device 3, in a case of "mishit", that is, when the information is not stored in the cache memory 4. The comparator 7 compares the tag which is a portion of the address supplied from the processor 1 with a plurality of tags read out from the tag memory 5 and outputs a hit information in a case of "hit", that is, when the information requested by the processor 1 is stored in the cache memory 4 and a tag, which is the same as the tag, is found in the tags read out from the tag memory. The buffer 8 temporarily stores the address supplied from the processor 1. The buffer 9 temporarily stores the hit information supplied from the comparator 7. Buffer 10 temporarily stores the information read out from the cache memory 4. The buffer 11 temporarily stores the address generated by the address generator circuit 6. The buffers 8 to 11 are constructed with latches and flip-flops, etc., respectively. In order to effectively utilize the cache memory 4, the LRU information generator circuit 12 generates, on the basis of the hit information read out from the buffer 9, an LRU information indicating that an information among the information stored in the cache memory 4, which is not used for the longest time, is replaced by an information newly read out from the main memory device 3. The LRU information is stored in an address of the LRU memory 13, which address is read out from the buffer 8.

An operation of the cache memory control device constructed as mentioned above will be described. First, when the processor 1 requests an access to a certain information and supplies a certain address to the cache memory control device 2, the address is temporarily stored in the buffer 8. The same address is also supplied to the cache memory 4 and the tag memory 5. Therefore, a tag corresponding to the address is read out from the tag memory 5. The comparator 7 compares the tag corresponding to a portion of the address supplied from the processor 1 with a plurality of tags read out from the tag memory a and outputs a hit information in a case of "hit", that is, when the information requested by the processor 1 is stored in the cache memory 4 and a tag, which is the same as the tag corresponding to the portion of the address from the processor, is found in the tags read out from the tag memory. The buffer 9 temporarily stores the hit information supplied from the comparator 7. Simultaneously with this processing, an information corresponding to the address is read out from the cache memory 4 when it is hit and is temporarily stored in the buffer 10. The above mentioned processing up to the temporary storage of the information in the buffer 10 will be referred to as "first processing".

Then, the LRU information generator circuit 12 generates the LRU information on the basis of the hit information read out from the buffer 9 and the LRU information is stored in the address in the LRU memory 13, which is read out from the buffer 8. In the case of hit, the information temporarily stored in the buffer 10 is supplied to the processor 1. This processing will be referred to as "second processing".

The above mentioned first and second processing are executed in pipe-line.

On the other hand, in the case of mishit, the address generator 6 generates an address for reading an information corresponding to the address from the main memory device 3 and the this generated address is temporarily stored in the buffer 11. Therefore, the address temporarily stored in the buffer 11 is read out and supplied to the main memory device 3. Thus, the information corresponding to the address supplied from the main memory device 3 is read out and stored in the cache memory 4. Subsequently, the first processing and the second processing are executed.

When an address corresponding to an access request related to a certain information is supplied from the processor 1 in the conventional cache memory control device 2 mentioned above, it takes a time corresponding to at least one clock from the supply of the address An (n=1, 2, 3, . . . ) up to a time at which a search for a tag corresponding to the address in the tag memory 5 ends (see FIG. 10(1)). Therefore, in the case of hit, it takes a time corresponding to at least 1 clock to read out the requested information Dn (n=1, 2, 3, . . . ) from the cache memory 4 (see FIG. 10(2)). Thus, there is a defect that it is impossible to immediately respond to an access request from the processor 1, even when the information is stored in the cache memory 4.

Further, when there are successive hits in the described conventional cache memory control device 2, the cache memory 4, the tag memory 5 and the LRU memory 13 are always accessed with considerable power consumption since the reading of the information (see FIG. 10(2)), the reading of the tag (see FIG. 10(3)) and the update of the LRU information (see FIG. 10(4)) are executed in pipe line processing. Therefore, when the processor 1 and the cache memory control device 2 are constructed as a single IC chip, operating temperature of the IC chip is increased, causing the life thereof to be shortened. In order to solve this problem, a heat radiator or a fan has to be provided, resulting in another defect that the data processing device becomes high in cost and large in size.

SUMMARY OF THE INVENTION

The present invention was made in view of the above mentioned state of art and an object of the present invention is to provide a method and device for controlling a cache memory, with which a quick response to an access request from a processor is realized with reduced power consumption.

In order to achieve the above object, a cache memory control method according to a first aspect of the present invention, which is used in a cache memory control device including a cache memory storing an information, a tag memory storing tags constructing addresses corresponding to the information stored in the cache memory and at least one buffer for temporarily storing tags read out from the tag memory. The cache memory control method is adapted to read out an information requested by a processor from the cache memory or a main memory device and supply it to the processor. The cache memory control method of the present invention is featured by comprising the steps of reading at least one of the tags stored in the tag memory, which tag constitutes an address corresponding to an information predicted as to be requested next by the processor, on the basis of the address corresponding to the information requested next by the processor, temporarily storing the tag read out from the tag memory in the buffer and comparing the tag constituting the address supplied next from the processor with the tag temporarily stored in the buffer, before the tag constituting the address supplied next from the processor is read out from the tag memory.

According to a second aspect of the present invention, in the cache memory control method according to the first aspect, the tag constituting the address corresponding to the information predicted as to be requested next by the processor is one of a tag corresponding to the information currently requested by the processor, a tag adjacent to the tag, a tag corresponding to an information requested past by the processor and a tag constituting an address corresponding to the information when an information stored in a discontinuous memory region of the main memory device is requested by the processor, or a combination of these tags.

A third aspect of the present invention resides in a cache memory control method, which is used in a cache memory control device including a cache memory storing an information, a tag memory storing tags constituting addresses corresponding to the information stored in the cache memory, a first buffer for temporarily storing tags read out from the tag memory, a second buffer for temporarily storing an information read out from the main memory device and a third buffer for temporarily storing addresses temporarily stored in the second buffer. The cache memory control method according to the third aspect of the present invention is adapted to read out an information requested by a processor from the cache memory or a main memory device and supply it to the processor. The cache memory control method according to the third aspect of the present invention is featured by comprising a first processing composed of the steps of reading an information from the cache memory or the second buffer and supplying it to the processor when an address corresponding to a requested information supplied from the processor or a tag constituting the same address coincides with the address temporarily stored in the third buffer or the tag temporarily stored in the first buffer, or reading out the tag constituting the address supplied from the processor from the tag memory and temporarily storing it in the first buffer when the address corresponding to the requested information supplied from the processor or the tag constituting the same address does not coincide with the address temporarily stored in the third buffer or the tag temporarily stored in the first buffer stored in the cache memory, and a second processing composed of the steps of reading an information from the cache memory and supplying it to the processor when the tag constituting the address supplied from the processor coincides with the tag temporarily held in the first buffer in the first processing, or reading out the information from the main memory device on the basis of the address supplied from the processor, temporarily storing the information in the second buffer and the cache memory and temporarily holding the address of the information temporarily held in the second buffer in the third buffer when the tag constituting the address supplied from the processor does not coincide with the tag temporarily held in the first buffer in the first processing.

A fourth aspect of the present invention is featured by that, in the third aspect, the cache memory control device further includes a fourth buffer for temporarily storing a tag of an information predicted as to be requested next by the processor, which is read out from the tag memory, that a third processing for reading the tag of the information predicted as to be requested next by the processor from the tag memories and temporarily storing the tag in the fourth buffer and that, in the first processing, one of the address temporarily stored in the third buffer and the tags temporarily stored in the first and fourth buffers is determined as being coincident with the address supplied from the processor or the tag constituting the address.

According to a fifth aspect of the present invention, a cache memory control method for reading an information requested by a processor from a cache memory or a main memory and supplying the information to the processor, the cache memory control device including tag memories for storing tags constituting addresses corresponding to information stored in the cache memory, a tag buffer for temporarily storing a tag read out from the tag memories, an information buffer for temporarily storing an information read out from the main memory, a backup buffer for temporarily storing an address of the information temporarily stored in the information buffer, a last buffer for temporarily storing a newest tag, a next buffer for temporarily storing a tag adjacent to the tag constituting the address supplied from said processor and corresponding to the information requested thereby and a branch buffer for temporarily storing a tag constituting an address of an information temporarily stored in a discontinuous memory region of said main memory when the information is requested by the processor. The cache memory control method comprises a first processing for reading the information from the cache memory or the information buffer and supplying the information to the processor when an address supplied from the processor or a tag constituting the address is coincident with an address temporarily stored in the backup buffer or a tag temporarily stored in the last buffer, the next buffer or the branch buffer, a second processing for reading the information from the cache memory and supplying the information to the processor when the tag constituting the address supplied from the processor is coincident with the tag temporarily stored in the tag buffer, a third processing reading the information from the main memory on the basis of the address supplied from the processor, temporarily storing the information in the information buffer and in the cache memory and temporarily storing addresses of the information temporarily stored in the information buffer in the backup buffer, a fourth processing for reading the tag constituting the address supplied from the processor from the tag memories and temporarily storing the tag in the tag buffer and a fifth processing for reading the tag adjacent to the tag constituting the address supplied from the processor and temporarily storing the adjacent tag in the next buffer, and, the information stored in the discontinuous memory region of the main memory is requested by the processor, temporarily storing the tag constituting the address corresponding to the information in the branch buffer and, otherwise, temporarily storing the information in the last buffer.

According to a sixth aspect of the present invention, in the cache memory control method according to the fifth aspect, the first to third processing are performed in parallel to the fourth and fifth processing independently therefrom.

According to a seventh aspect of the present invention, in the cache memory control method according to the fifth or sixth aspect, the cache memory is composed of a plurality of ways each composed of a plurality of entries for storing a plurality of information. The next buffer and the tag buffer are provided for each way, respectively, the information buffer is provided for each of information stored in each of the entries. In the third processing, all information constituting the entries to which the informations belong are read out from the main memory and temporarily stored in the plurality of the information buffers.

According to an eighth aspect of the present invention, a cache memory control device for reading an information requested by a processor from a cache memory or a main memory and supplying the information to said processor, comprises tag memories for storing tags constituting addresses corresponding to information stored in the cache memory, at least one buffer for reading a tag constituting an address corresponding to an information predicted as to be requested next by the processor, on a basis of an address supplied from the processor and corresponding to a requested information, and temporarily storing the tag in at least one of the tag memories and a comparator for comparing the tag constituting the address supplied next by the processor with the tag temporarily stored in the buffer, before the tag constituting the address supplied next by the processor is read out from the at least one of the tag memories.

According to a ninth aspect of the present invention, in the cache memory control device according to the eighth aspect, the tag constituting the address corresponding to the information predicted as to be requested next by said processor is one of a tag corresponding to an information currently requested by the processor, a tag adjacent to the tag corresponding to the information currently requested by the processor, a tag corresponding to an information requested by the processor in the past and a tag constituting an address corresponding to an information in a case where the information stored in a discontinuous memory region of the main memory is requested by the processor, or a combination of these tags.

According to a tenth aspect of the present invention, a cache memory control device for reading an information requested by a processor from a cache memory or a main memory and supplying the information to the processor, comprises tag memories for storing tags constituting addresses corresponding to information stored in the cache memory, a first buffer for temporarily storing a tag read out from the tag memories, a second buffer for temporarily storing an information read out from the main memory, a third buffer for temporarily storing an address of an information temporarily stored in the second buffer, a first comparator for comparing a tag constituting an address supplied from the processor and corresponding to an information requested by the processor with a tag temporarily stored in the first buffer and outputting a hit signal when the tags are coincident, a second comparator for comparing the address supplied from the processor with the address temporarily stored in the third buffer and outputting a hit signal when the addresses are coincident. The information is read out from the cache memory or the second buffer and supplied to the processor when either the first or second comparator outputs a hit signal, the tag constituting the address supplied from the processor is read out from the tag memory and temporarily stored in the first buffer when neither the first nor second comparator outputs a hit signal, the information read out from the cache memory and supplied to the processor when the first comparator outputs the hit signal, or the information is read out from the main memory on the basis of the address supplied from the processor and temporarily stored in the second buffer and the cache memory and the address of the information temporarily stored in the second buffer is temporarily stored in the third buffer when the first comparator outputs no hit signal.

According to an eleventh aspect to the present invention, in the tenth aspect, the cache memory control device further comprises a fourth buffer for temporarily storing a tag of an information predicted as to be requested next by the processor and read out from the tag memories and a third comparator for comparing the tag constituting the address supplied from the processor with the tag temporarily stored in the fourth buffer and outputting a hit signal when the tags are coincident. The information is read out from the cache memory or the second buffer and supplied to the processor when the first to third comparators output the hit signals, the tag constituting the address supplied from the processor is read out from the tag memory and temporarily stored in the first buffer and a tag of an information predicted as to be requested next by the processor is read out from the tag memory and temporarily stored in the fourth buffer when the first to third comparators outputs no hit signal, the information is read out from the cache memory and supplied to the processor when the first comparator outputs the hit signal, or the information is read out from the main memory on the basis of the address supplied from the processor and temporarily stored in the second buffer and the cache memory and the address of the information temporarily stored in the second buffer is temporarily stored in the third buffer when the first comparator outputs no hit signal.

According to a twelfth aspect of the present invention, a cache memory control device for reading an information requested by a processor from a cache memory or a main memory and supplying the information to the processor, comprises tag memories for storing tags constituting addresses corresponding to information stored in the cache memory, a tag buffer for temporarily storing a tag read out from the tag memories, an information buffer for temporarily storing an information read out from the main memory, a backup buffer for temporarily storing an address of an information temporarily stored in the information buffer, a last buffer for temporarily storing a newest tag, a next buffer for temporarily storing a tag adjacent to the tag constituting an address supplied from the processor and corresponding to an information requested by the processor, a branch buffer for temporarily storing a tag constituting an address of an information temporarily stored in a discontinuous memory region of the main memory when the information is requested by the processor, a first, second, third and fourth comparators each for comparing a tag constituting an address supplied from the processor and corresponding to an information requested by the processor with a tag temporarily stored in different one of the tag buffer, the last buffer, the next buffer and the branch buffer and outputting a hit signal when the tags are coincident and a fifth comparator for comparing the address supplied from the processor with the address temporarily stored in the backup buffer and outputting a hit signal when the addresses are coincident. The cache memory control device takes in a first state in which, when the second to fifth comparators output the hit signals, the information is read out from the cache memory or the information buffer and supplied to the processor, a second state in which, when the first comparator outputs the hit signal, the information is read out from the cache memory and supplied to the processor, a third state in which the information is read out from the main memory on the basis of the address supplied from the processor, temporarily storing the information in the information buffer and in the cache memory and addresses of the information temporarily stored in the information buffer are temporarily stored in the backup buffer, a fourth state in which the tag constituting the address supplied from the processor is read out from the tag memories and temporarily stored in the tag buffer and a fifth state in which the tag adjacent to the tag constituting the address supplied from the processor is read out from the tag memories and temporarily stored in the next buffer, and, when the information stored in the discontinuous memory region of the main memory is requested by the processor, the tag constituting the address corresponding to the information is temporarily stored in the branch buffer and, otherwise, the tag constituting the address corresponding to the information is temporarily stored in the last buffer.

According to a thirteenth aspect of the present invention, the first to third states of the cache memory control device according to the twelfth aspect are in parallel to the fourth and fifth states independently therefrom.

According to a fourteenth aspect of the present invention, the cache memory of the cache memory control device according to the twelfth or thirteenth aspect is composed of a plurality of ways each composed of a plurality of entries for storing a plurality of information. The next buffer, the tag buffer and the first and third comparators are provided for each way, respectively, the information buffer is provided for each of information stored in each of the entries, and a predetermined number of the branch buffers and a predetermined number of the fourth comparators are provided. In the third state, all information constituting the entries to which the information belong are read out from the main memory and temporarily stored in the plurality of the information buffers.

According to the construction of the present invention, it is possible to immediately respond to an access request from a processor and to reduce power consumption.

BRIEF DESCRIPTION OF THE DRAWINGS

This above mentioned and other objects, features and advantages of the present invention will become more apparent by reference to the following detailed description of the invention taken in conjunction with the accompanying drawings, in which:

FIG. 10 is a timing chart for explaining defects of the conventional cache memory control device.

DETAILED DESCRIPTION OF THE PREFERRED EMBODIMENTS

Embodiments of the present invention will be described with reference to the accompanying drawings.

Figure 1:
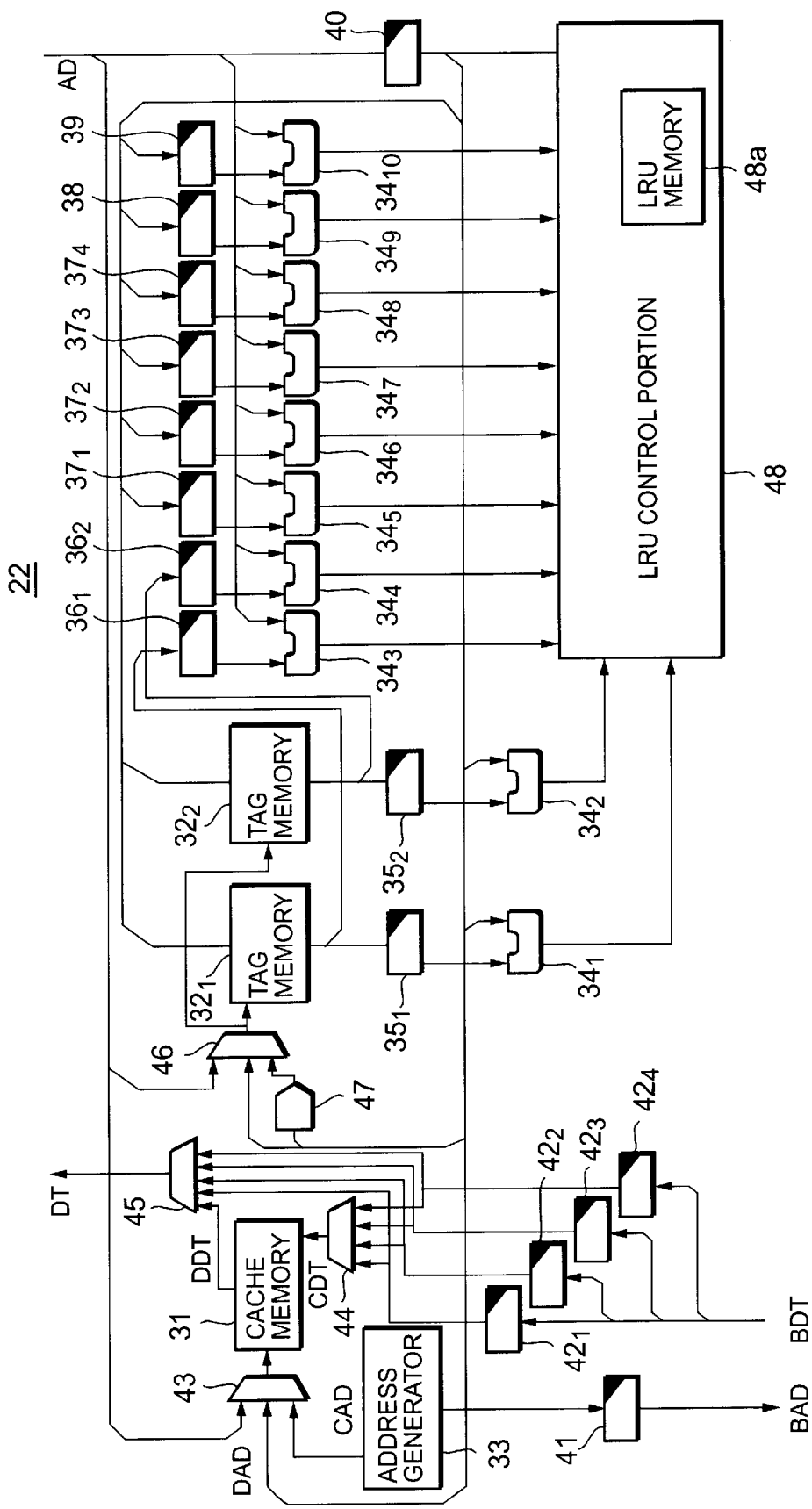
FIG. 1 is a block circuit diagram showing an electrical construction of a main portion of a cache memory control device according to a first embodiment of the present invention.
Figure 2:
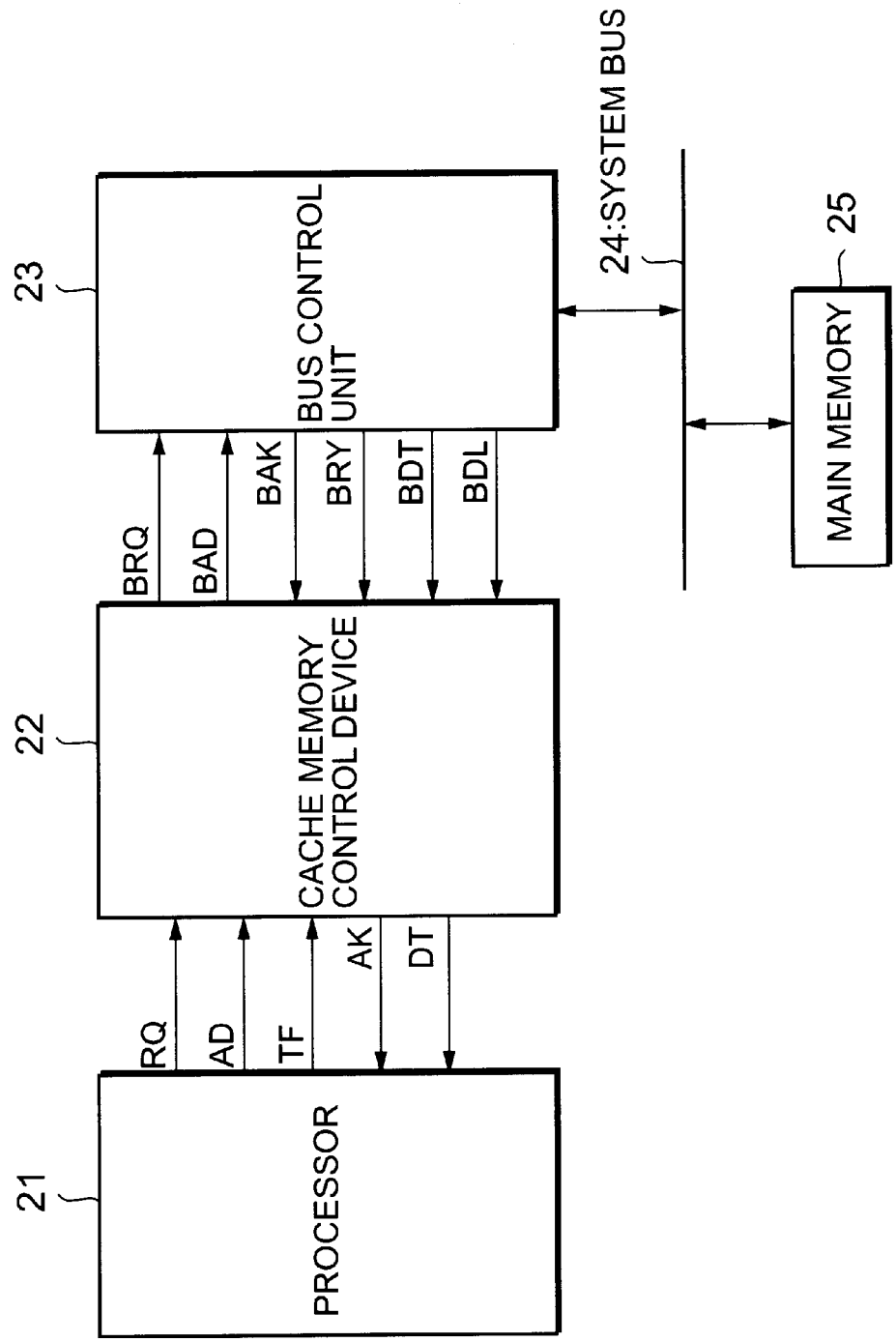
FIG. 2 is a block circuit diagram showing an electrical construction of a main portion of a data processing unit to which the cache memory control device shown in FIG. 1 is applied.
Figure 3:
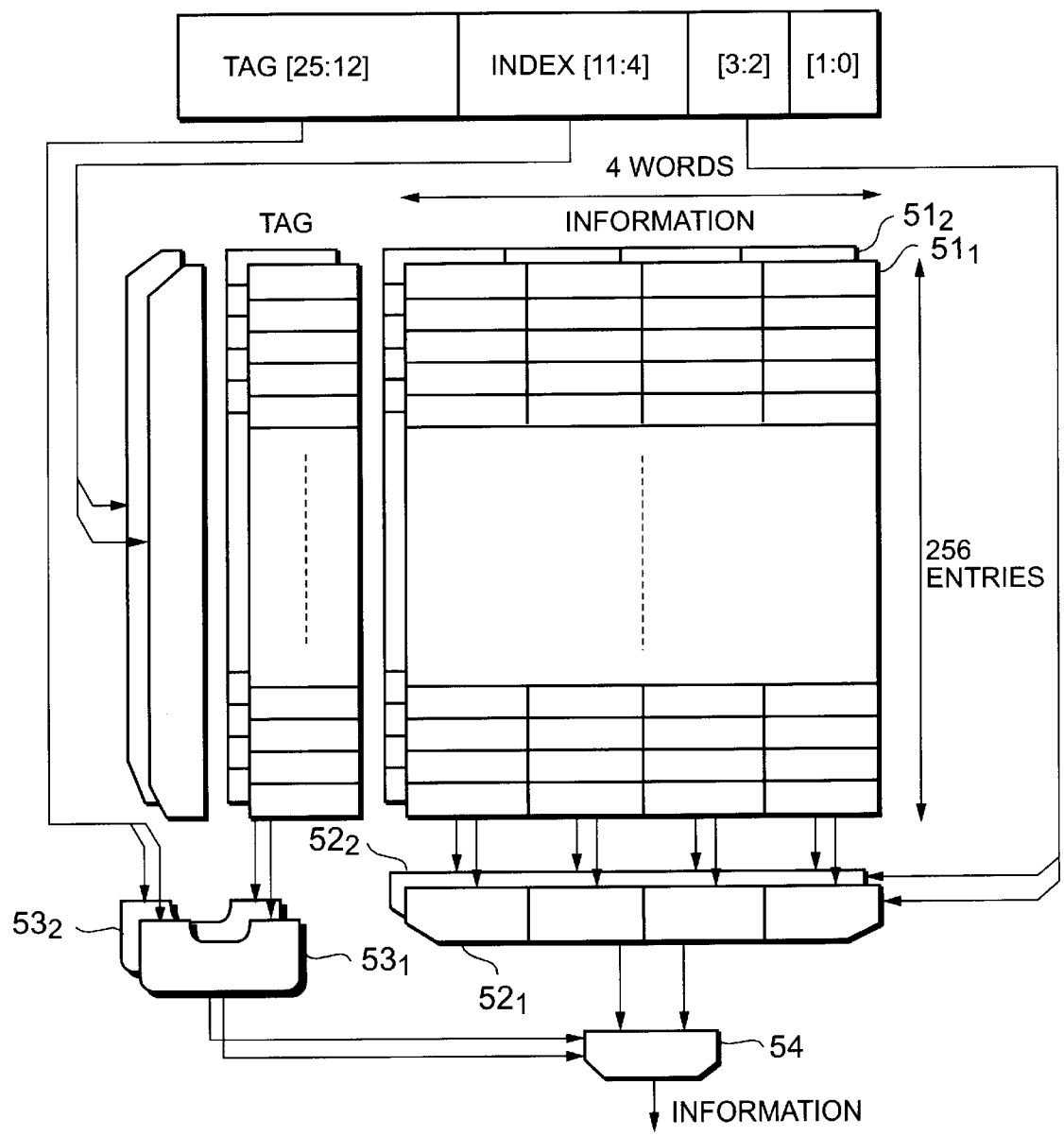
FIG. 3 is a block circuit diagram showing an electrical construction of a cache memory constructing the cache memory control device shown in FIG. 1.

FIG. 1 is a block circuit diagram showing an electrical construction of a main portion of a cache memory control device according to a first embodiment of the present invention, FIG. 2 is a block circuit diagram showing an electrical construction of a main portion of a data processing unit to which the cache memory control device shown in FIG. 1 is applied and FIG. 3 is a block circuit diagram showing an electrical construction of a cache memory constructing the cache memory control device shown in FIG. 1.

As shown in FIG. 2, the data processing unit is mainly constructed with a processor 21, a cache memory control device 22, a bus control unit 23, a system bus 24 and a main memory device 25.

The processor 21 is adapted to perform a data processing by controlling various portions of the data processing unit, to supply an access request signal RQ requesting an access of a certain information such as instructions and data, etc., to the cache memory control device 22 and to supply an address signal AD of the information to the cache memory control device 22 in synchronism with the access request signal RQ. Further, when an access request of an information such as branch instruction and discontinuous data, etc., stored in a discontinuous memory region of the main memory device 25 is performed (referred to as "discontinuous access"), the processor 21 supplies a discontinuous access signal TF indicative of the discontinuous access to the cache memory device 22, in addition to the signals RQ and AD.

Therefore, in a case of hit, the cache memory control device 22 supplies an acknowledge signal AK indicative of the fact to the processor 21 and also supplies thereto an information signal DT as the access requested data in synchronism with the acknowledge signal AK. In a case of mishit, the cache memory control device 22 supplies an access request signal BRQ requesting an access of the same information or data to the bus control unit 23 in order to acquire the same data from the main memory device 25 and supplies an address signal BAD of the same data thereto in synchronism with the access request signal BRQ.

Thus, the bus control unit 23 supplies an acknowledge signal BAK indicative of a reception of the address signal BAD to the cache memory control device 22 and, after the same data is read out from the main memory device 25 through the system bus 24, supplies a ready signal BRY indicative of the fact that the same data is read out from the main memory device 25 to the cache memory control device 22 and supplies the same data to the cache memory control device 22 as an information signal BDT, in synchronism with the ready signal BRY. In this case, the bus control unit 23 supplies a byte signal BDL of 4 bits, which indicates the order of byte with which the same information is indicated, to the cache memory control device 22.

As shown in FIG. 1, the cache memory control device 22 is mainly constructed with tag memories $32_1$ and $32_2$, an address generator circuit 33, comparators $34_1$ to $34_{10}$, tag buffers $35_1$ and $35_2$, next buffers $36_1$ and $36_2$, branch buffers $37_1$ to $37_4$, a last buffer 38, a backup buffer 39, an address input buffer 40, an address output buffer 41, information buffers $42_1$ to $42_1$, selectors 43 to 46, an incrementer 47 and an LRU control portion 48.

In this embodiment, a memory capacity of the main memory device 25 is 64 MB and that of the cache memory 31 is 8 kB. As shown in FIG. 3, the cache memory 31 is composed of two ways $51_1$ and $51_2$ each having memory capacity of 4 kB. Each way 51 is divided to 256 entries each storing 4 information each 1 word long, that is, 32 bits long, since 1 word includes 4 bytes each having 8 bits. Each row in FIG. 3 is called a line 128 (=32×4) bits long. Correspondingly to this construction of the cache memory 31, the main memory device 25 is divided to 16384 (=$2^{26}/2^{12}$) blocks every 4 kB, since 64 MB is $2^{26}$ and 4 kB is $2^{12}$. Further, in order to access respective information, the bit length of the address signal AD supplied from the processor 21 is 26 bits. Lower 2 bits including second and third least significant bits of the address signal AD constitute an information select signal for selecting one of 4 data constructing 1 line and middle 8 bits including fourth to eleventh least significant bits constitute an index signal for selecting one of 256 entries. Upper 8 bits including twelfth to twenty fifth least significant bits thereof become a tag signal for selecting one of 16384 blocks of the main memory device 25.

Therefore, in each of the 2ways $51_1$ and $51_2$, the information corresponding to one line is read out correspondingly to the index signal constituting the middle bits of the address signal AD supplied from the processor 21 and temporarily stored in registers $52_1$ and $52_2$. Then, the tag corresponding to the read-out information corresponding to one line is compared with the tag constituting the upper bits of the supplied address signal AD by comparators $53_1$ and $53_2$. When the both tags are coincident, a way selection signal is output from one of the comparators. One of the 4 data constituting one line is selected from the register $52_1$ and $52_2$, correspondingly to the information select signals and the selected information are supplied to a way selector 54. The way selector 54 selects 1-word information from the register $52_1$ and $52_2$ on the basis of the way select signal and output therefrom.

In FIG. 1, the tag memories $32_1$ and $32_2$ are provided correspondingly to the ways $51_1$ and $51_2$, respectively, shown in FIG. 3 and a tag of 14 bits is stored in each of 256 entries. The address generator circuit 33 generates an address for reading an access information requested by the processor 21 from the main memory device 25 in the case of mishit.

The address input buffer 40 temporarily stores an address signal AD corresponding to an access request of a certain information supplied from the processor 21. The last buffer 38 temporarily stores a newest tag (referred to as "last tag LTG") which is a portion of a newest address signal AD stored temporarily in the address input buffer 40. The address output buffer 41 temporarily stores an address generated by the address generator circuit 33 in a case of mishit. The information buffers $42_1$ to $42_1$ temporarily store information read out from the main memory device 25 in the case of mishit. Reading of information from the main memory device 25 in order to refill the cache memory 31 with a new information in this manner is referred to as "cache fill". Incidentally, the reason for the provision of the four information buffers 42 is that the memory capacity of each information buffer corresponds to one word and an amount of information read out from the main memory device 25 at once corresponds to one line composed of 4 words. The backup buffer 39 temporarily holds a header address of a line belonging to an information temporarily held in the information buffers $42_1$ to $42_4$ in the case of cache fill.

The branch buffers $37_1$ to $37_4$, temporarily hold tags which are portions of the address signal AD supplied from the processor 21 in the case of discontinuous access. Although the number of the branch buffers 37 is 4 in this embodiment, it is not limited thereto and the larger the number of the branch buffers 37 results in the smaller the possibility of mishit in the case of discontinuous access. The next buffers $36_1$ and $36_2$ are provided correspondingly to the tag memories $32_1$ and $32_2$, respectively. When there is a continuous access request of information from the processor 21, tags (each referred to as "next tag NTG"), which are portions of an address signal AD of an information predicted as to be access-requested next, is preliminarily read out from the tag memories $32_1$ and $32_2$ and temporarily stored in the next buffers $36_1$ and $36_2$, respectively. The tag buffers $35_1$ and $35_2$ are provided correspondingly to the tag memories $32_1$ and $32_2$ and temporarily store tags read out from tag memories $32_1$ and $32_2$, respectively.

The buffers $35_1$ and $35_2$, $36_1$ and $36_2$, $37_1$ to $37_1$, 38 to 41 and $42_1$ to $42_4$, mentioned above are constructed with latches and flip-flops, etc., respectively.

The comparators $34_1$ and $34_2$ are provided correspondingly to the tag memories $32_1$ and $32_2$, respectively, compare the tags temporarily stored in the tag buffers $35_1$ and $35_2$ with the tag which is a portion of the address signal AD temporarily stored in the address input buffer 40 and supply hit information to the LRU control portion 48 when the tags in the tag buffers $35_1$ and $35_2$ are coincident with the tag in the address input buffer 40. The comparators $34_3$ and $34_4$ compare the next tags NTG's temporarily stored in the next buffers $36_1$ and $36_2$ with a tag which is a portion of the address signal AD supplied from the processor 21 and supply hit information to the LRU control portion 48 when the next tags are coincident with the tag. The comparators 34 to $34_8$ compare tags temporarily stored in the branch buffers $37_1$ to $37_7$ with the tag which is a portion of the address signal AD supplied from the processor 21 and supply hit information to the LRU control portion 48 when the tags in the branch buffers are coincident with the tag. The comparator $34_9$ compares the last tag LTG temporarily stored in the last buffer 38 with a tag which is a portion of the address signal AD supplied from the processor 21 and supplies a hit information to the LRU control portion 48 when they are coincident. The comparator $34_{10}$ compares the address temporarily stored in the backup buffer 39 with the address signal AD supplied from the processor 21 and supplies a hit information to the LRU control portion 48 when they are coincident.

The selector 43 is input with the address signal AD supplied from the processor 21, the address signal AD temporarily stored in the address input buffer 40 and the address generated by the address generator circuit 33, selects one of them and supplies the selected address to the cache memory 31. The selector 44 is input with information temporarily stored in the information buffers $42_1$ to $42_4$, selects one of them and supplies the selected information to the cache memory 31.

The selector 45 is input with the information read out from the cache memory 31 and the information temporarily stored in the information buffers $42_1$ to $42_4$, selects one of them and supplies the selected information to the processor 21 as the information signal DT. In order to preliminarily read the next tag NTG from the tag memories $32_1$ and $32_2$ when there is a continuous access request of information from the processor 21, the incrementer 47 increments an index value of a current address signal AD stored temporarily in the address input buffer 40 by +1.

The selector 46 is input with the address signal AD supplied from the processor 21, the address signal AD temporarily stored in the address input buffer 40 and the address supplied from the incrementer 47, selects one of them and supplies the selected address to the tag memories $32_1$ and $32_2$. The LRU control portion 48 includes a LRU memory 48a. The LRU control portion 48 generates the LRU information on the basis of the hit information supplied from the comparators $34_1$ to $34_{10}$, and puts the LRU information in the address temporarily stored in the address input buffer in the LRU memory 48a.

Figure 4:
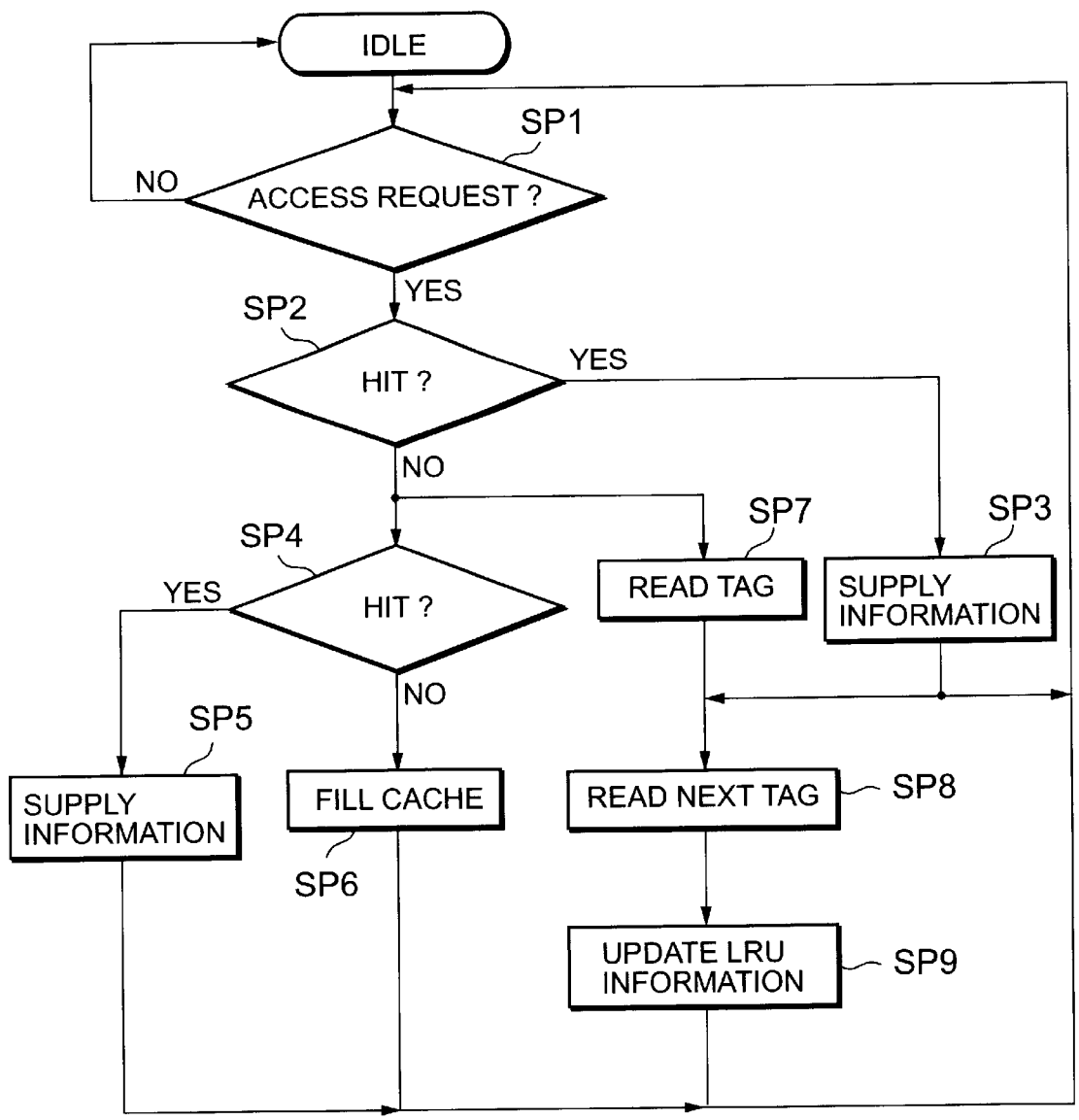
FIG. 4 is a flowchart showing an operation of the cache memory control device shown in FIG. 1.

Now, an operation of the cache memory control device having the construction mentioned above will be described with reference to a flowchart shown in FIG. 4 and timing charts shown in FIGS. 5 and 6.

In this embodiment, the control of the cache memory 31 and a peripheral circuit thereof (referred to as "cache control") and the control of the tag memories $32_1$ and $32_2$, (referred to as "tag control") are performed independently in parallel. Therefore, the flowchart shown in FIG. 4 is different from a usual flowchart in which respective processing is executed one by one along a time.

First, in the cache control, there are four states, an idle state IDLE, a buffer check state BFCH, a tag check state TGCH and a cache fill state FILL. The idle state IDLE is a state in which there is no control performed against the cache memory 31 and a peripheral circuit thereof.

The buffer check state BFCH is a state in which the comparators $34_1$ to $34_{10}$ compare the tags and the addresses, which are temporarily stored in the next buffers $36_1$ and $36_2$, the branch buffers $37_1$ to $37_1$, the last buffer 38 and the backup buffer 39, with the address signal AD supplied from the processor 21 and the tag, which is a portion of the address signal AD, supply an information corresponding to the tag or the address to the processor 21 in the case of hit in any of the comparators 34 and is shifted to the tag check state TGCH to be described next in the case of mishit. The tag check state TGCH is a state in which the comparators $34_1$ and $34_2$ compare the tags and the addresses, which are temporarily stored in the tag buffers $35_1$ and $35_2$ with the address signal AD temporarily stored in the address input buffer 40 and the tag, which is a portion of the address signal AD, supply an information corresponding to the tag or the address to the processor 21 in the case of hit in any of the comparators 34 and is shifted to the cache fill state FILL to be described later in the case of mishit.

The cache fill state FILL is a state in which, in the case of mishit, an access to an information to which an access is requested by the processor 21 is requested by generating an address by the address generator circuit 33 on the basis of the address signal AD supplied from the processor 21 and supplying the this generated address to the bus control unit 23, the information supplied from the bus control unit 23 is temporarily stored in the information buffers $42_1$ to $42_4$ and stored in the cache memory 31 and the header address of the line to which the same information belongs is temporarily stored in the backup buffer 39. Since, therefore, the information temporarily stored in the information buffers $42_1$ to $42_4$ correspond to the addresses temporarily stored in the backup buffer 39, in the case of hit in the comparator $34_{10}$, there is no need of reading the information corresponding thereto and it can be read out directly from the information buffers $42_1$ to $42_4$. Consequently, it becomes possible to reduce the access frequency to the cache memory 31 to thereby reduce the power consumption.

The tag control includes a tag read state TGRD, a next tag read state NTRD and a LRU information write state LRWT. In the tag read state TGRD, tags are read out from the tag memories $32_1$ and $32_2$ and temporarily stored in the tag buffers $35_1$ and $35_2$, in the case of mishit. In the next tag read state NTRD, the index value of the current address signal AD temporarily stored in the address input buffer 40 is incremented by +1 by the incrementer 47, the next tag NTG is preliminarily read out from the tag memories $32_1$ and $32_2$ on the basis of this new address and temporarily stored in the next buffers $36_1$ and $36_2$, a tag which is a portion of the current address signal AD temporarily stored in the address input buffer 40 is temporarily stored in one of the branch buffers $37_1$ to $37_4$ when there is no continuous access request of information from the processor 21, otherwise, the tag is temporarily stored in the last buffer 38. In the LRU information write state LRWT, the LRU control portion 48 updates the LRU information stored in the LRU memory 48a on the basis of the hit information supplied from the comparators $34_1$ to $34_{10}$.

In this embodiment, there are three processing basically and these processing will be described with reference to a flowchart shown in FIG. 4.

A first processing is composed of a cache control flow including the steps SP1, SP2, SP4 and SP6 and a tag control flow including the steps SP7, SP8 and SP9 which are performed in parallel to the cache control flow. In the cache control, the state is shifted from the idle state IDLE through the buffer check state BFCH (SP1, SP2, SP4) to the cache fill state FILL (SP6) and, in the tag control, from the tag read state TGRD (SP7) through the next tag read state NTRD (SP8) to the LRU information write state LRWT (SP9). The tag check state TGCH is processed in parallel to the next tag read state NTRD and the cache fill state FILL is processed in parallel to the LRU information write state LRWT. Such processing is performed in order to perform the cache fill in a case where an information access-requested by the processor 21 is not stored in the cache memory 31 and an address signal AD supplied from the processor 21 or a tag which is a portion of the address signal AD is not stored in any of the next buffers $36_1$ and $36_2$, the branch buffers $37_1$ to $37_1$, the last buffer 38, the backup buffer 39 and the tag memories $32_1$ and $32_2$. In such case, when the state is changed from the buffer check state BFCH to the tag check state TGCH in the cache control, the tag read state TGRD is activated in the tag control and, thereafter, the next tag read state NTRD and the LRU information write state LRWT are activated sequentially every cycle.

The second processing is composed of the cache control flow including the steps SP1, SP2, SP4 and SP5 and the tag control flow in parallel to the cache control flow and including the steps SP7, SP8 and SP9. In the cache control, the state is shifted from the idle state IDLE through the buffer check state BFCH to the tag check state TGCH and, in the tag control, from the tag read state TGRD through the next tag read state NTRD to the LRU information write state LRWT. The tag check state TGCH is processed in parallel to the next tag read state NTRD. The buffer check state BFCH related to the information access-requested next by the processor 21 is processed in parallel to the LRU information write state LRWT. Such processing is performed in a case where an information access-requested by the processor 21 is stored in the cache memory 31 and an address signal AD supplied from the processor 21 or a tag which is a portion of the address signal AD is stored not in any of the next buffers $36_1$ and $36_2$, the branch buffers $37_1$ to $37_4$, the last buffer 38, the backup buffer 39 and the tag memories $32_1$ and $32_2$ but in the tag memory $32_1$ or $32_2$. In such case, when the state is changed from the buffer check state BFCH to the tag check state TGCH in the cache control, the tag read state TGRD is activated in the tag control and, thereafter, the next tag read state NTRD and the LRU information write state LRWT are activated sequentially every cycle.

The third processing is composed of a cache control flow including the steps SP1, SP2 and SP3 and a tag control flow including the steps SP8 and SP9 subsequent to the cache control flow. In the cache control, the state is shifted from the idle state IDLE to the buffer check state BFCH and, in the tag control, from the next tag read state NTRD to the LRU information write state LRWT. Such processing is performed in a case where an information access-requested by the processor 21 is stored in the cache memory 31 and an address signal AD supplied from the processor 21 or a tag which is a portion of the address signal AD is stored in any of the next buffers $36_1$ and $36_2$, the branch buffers $37_1$ to $37_4$, the last buffer 38, the backup buffer 39 and the tag memories $32_1$ and $32_2$. In such case, it becomes possible to request an access and supply a corresponding information within one clock to thereby increase a response speed to the access request from the processor 21, compared with the conventional system.

Now, an operation of the cache memory control device will be described with reference to the flowchart shown in FIG. 4. First, as the cache control, it is determined after the idle state IDLE, whether or not there is an access request from the processor 21 (step SP1). If NO, the operation is returned to the idle state IDLE. If YES, that is, there is an access request from the processor 21, the operation is shifted to the buffer check state BFCH.

In the buffer check state BFCH, the comparators $34_1$ to $34_{10}$ compare the address or tag temporarily stored in any of the next buffers $36_1$ and $36_2$, the branch buffers $37_1$ to $37_4$, the last buffer 38 and the backup buffer 39 with an address signal AD supplied from the processor 21 or a tag which is a portion of the address signal AD to determine whether or not a hit information is output from any one of the comparators 34 (step SP2). If YES, the selector 45 selects the information read out from the cache memory 31 and supplies it to the processor 21 as an information signal DT (step SP3). Thereafter, the operation is returned to the step Sp1 for the cache control and, simultaneously therewith, the next tag read state NTRD is activated for the tag control (SP8).

Thus, in the step SP8, the incrementer 47 increments the index value of the current address signal AD temporarily stored in the address input buffer 40 by +1 and a next tag NTG is read out from the tag memories $32_1$ and $32_2$ on the basis of the resulting new address and temporarily stored in the next buffers $36_1$ and $36_2$. In this case, when there is no continuous access request of information from the processor 21, a tag which is a portion of the current address signal AD temporarily stored in the address input buffer 40 is temporarily stored in any one of the branch buffers $37_1$ to $37_4$, otherwise, it is temporarily stored in the last buffer 38 as a last tag LTG (step SP8). Further, in the LRU information write state LRWT (SP9), the LRU control portion 48 updates the LRU information stored in the LRU memory 48a on the basis of the hit information supplied from the comparators $34_1$ to $34_{10}$. Thereafter, the operation is returned to the step SP1 for the tag control. The above mentioned operation is the third processing.

On the other hand, when the determination in the step SP2 indicates "NO", that is, when the address signal AD supplied from the processor 21 or a tag which is a portion of the address signal AD, is not stored in any of the next buffers $36_1$ and $36_2$, the branch buffers $37_1$ to $37_4$, the last buffer 38 and the backup buffer 39, shown in FIG. 1, the operation is shifted to the tag check state TGCH for the cache control and the tag read state TGRD is activated for the tag control.

Thus, the comparators $34_1$ and $34_2$ compare the tags temporarily stored in the tag buffers $35_1$ and $35_2$ with the tag which is a portion of the address signal AD temporarily stored in the address input buffer 40, respectively, to determine whether a hit information is output (step SP4). If YES, the selector 45 selects the information read out from the cache memory 31 and supplies it to the processor 21 as the information signal DT (step SP5). The above mentioned operation is performed in the tag check state TGCH. Thereafter, the operation is returned to the step SP1 for the cache control.

In parallel to this operation, the tags are read out from the tag memories $32_1$ and $32_2$ and, after the tags are temporarily stored in the tag buffers $35_1$ and $35_2$, respectively, in the tag read state TGRD (step SP7), the incrementer 47 increments the index value of the current address signal AD temporarily stored in the address input buffer 40 by +1 and the next tag NTG is read out from the tag memories $32_1$ and $32_2$ and temporarily stored in the next buffers $36_1$ and $36_2$, respectively. When there is no continuous access request from the processor 21, the tag which is a portion of the current address signal AD temporarily stored in the address input buffer 40 is temporarily stored in any one of the branch buffers $37_1$ to $37_4$, otherwise, stored in the last buffer 38 as the last tag LTG, in the next tag read state NTRD (step SP8). Further, in the LRU control portion 48, the LRU information stored in the LRU memory 48a is updated on the basis of the hit information supplied from the comparators $34_1$ to $34_{10}$ in the LRU information write state LRWT (step SP9). Thereafter, the operation is returned to the step Sp1 for the tag control. The above processing is the second processing.

On the other hand, if the determination made in the step SP4 is NO, that is, when no hit information is output from the comparators $34_1$ to $34_2$ as a result of comparison of the tags temporarily stored in the tag buffers $35_1$ and $35_2$ with a tag which is a portion of the address signal AD temporarily stored in the address input buffer 40, the operation is shifted to the cache fill state FILL for the cache control. Thus, an access request for the information accessed from the processor 21 is made to the bus control unit 23 and, when the same information is supplied from the bus control unit 23, the same information is temporarily stored in the information buffers $42_1$ to $42_4$. Simultaneously therewith, the same information is stored in the cache memory 31 and an address of the header of the line belonging to the same information is temporarily stored in the backup buffer 39 (step SP6). Thereafter, the operation is returned to the step SP1 for the cache control. Since the tag control is performed in the same manner as that of the second processing, details thereof is omitted. The above mentioned operation is the first processing.

An operation timing of the cache memory control device will be described with reference to timing charts shown in FIGS. 5 and 6.

First, the first processing mentioned above will be described with reference to the timing chart shown in FIG. 5.

Figure 5:
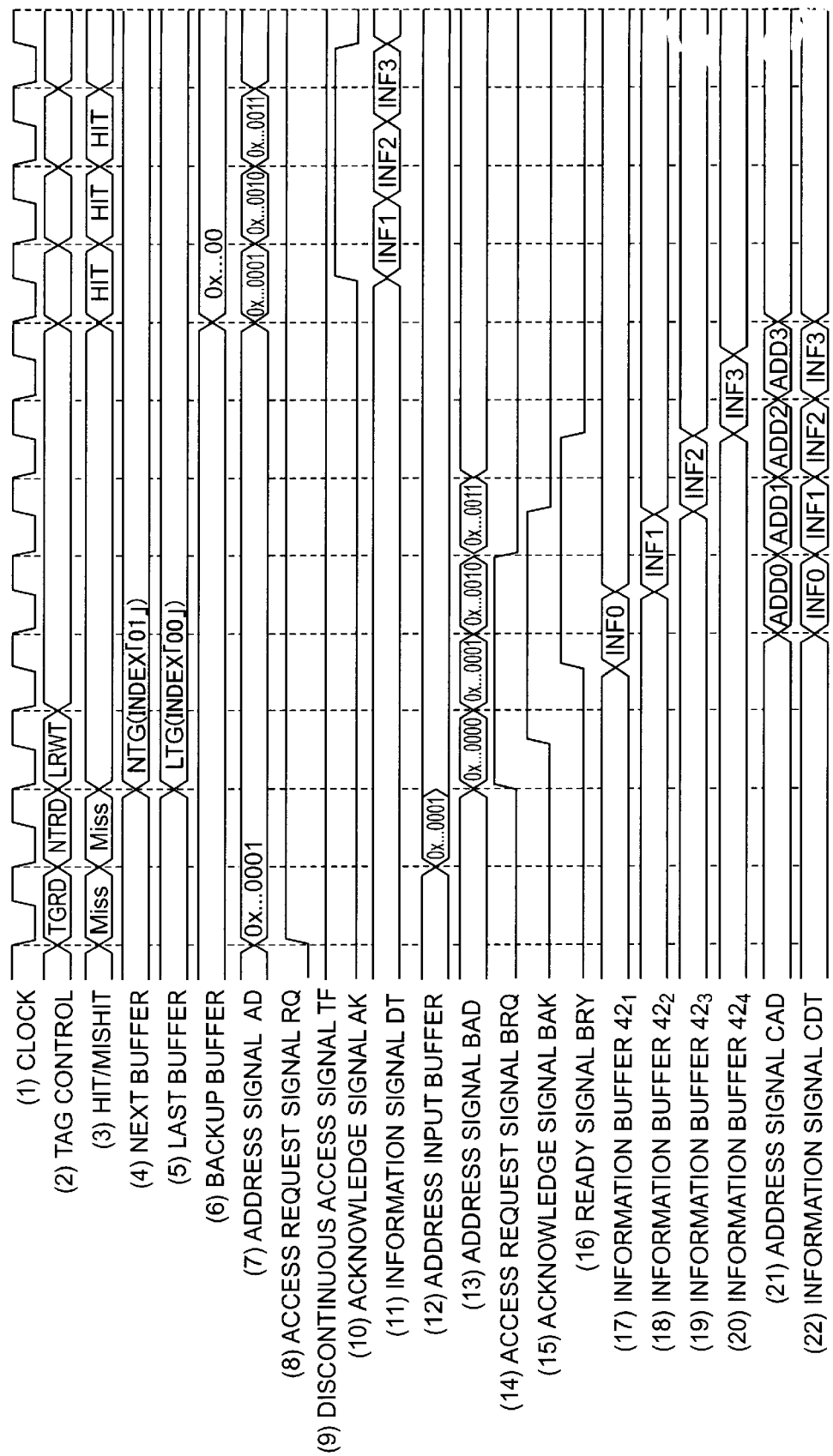
FIG. 5 is a timing chart for explaining a first and third processing performed in the cache memory control device shown in FIG. 1.

In the cache control, an address signal AD having a value "0x . . . 0001" (see FIG. 5(7)) is supplied from the processor 21 to the cache memory control device 22 in synchronism with an access request signal RQ (see FIG. 5(8)) to activate the buffer check state BFCH in a first cycle. However, since it becomes mishit (see FIG. 5(3)), the tag read state TGRD is activated for the tag control (see FIG. 5(2)). In a second cycle of the cache control, the operation is shifted to the tag check state TGCH. Since this becomes mishit (see FIG. 5(3)), the operation is shifted to the next tag read state NTRD (see FIG. 5(2)). In this case, the value "0x . . . 0001" of the address signal AD supplied from the processor 21. is temporarily stored in the address input buffer 40 (see FIG. 5(12)).

In a third cycle for the cache control, the operation is shifted to the cache fill state FILL in which the address generator 33 generates values corresponding to four addresses having values starting from the value "0x . . . 0000" of the header address of a line belonging to the information having a value "0x . . . 0001" of the address signal AD, by incrementing the value every cycle on the basis of the value "0x . . . 0001" of the address signal AD supplied from the processor 21. These address values are temporarily stored in the address output buffer 41 and, then, are supplied to the bus control unit 23 (see FIG. 5(13)) as an address signal BAD, in synchronism with the access request signal BRQ (see FIG. 5(14)). Thus, after substantially a half cycle from the start of the third cycle, an acknowledge signal BAK indicative of reception of the address signal BAD from the bus control unit 23 is supplied to the cache memory control device 22 (see FIG. 5(15)). On the other hand, in the tag control, the operation is shifted from the next tag read state NTRD to the LRU information write state LRWT (see FIG. 5(2)). In this case, a tag of a line (index number "01") next to the line (index number "00") to which the information having the address value "0x . . . 0001" belongs is temporarily stored in the next buffer $36_1$ or $36_2$ as the next tag NTG (see FIG. 5(4)) and the tag, which is temporarily stored in the address input buffer 40 and is a portion of the current address signal AD, is temporarily stored in the last buffer 38 as the last tag LTG (see FIG. 5(5)), since the discontinuous access signal TF is not active (see FIG. 5(9)).

In the fourth to eighth cycles for the cache control, the bus control unit 23 still in the cache fill state FILL reads out from the main memory device 25 an information INF0 to INF3 corresponding to one line access-requested by the cache memory control device 22 through the system bus 24 and, then, supplies the information INF0 to INF3 to the cache memory control device 22 every cycle as an information signal BDT in synchronism with a ready signal BRY (see FIG. 5(16)) indicative of read-out of the information from the main memory device 25. These information INF0 to INF3 are stored sequentially in the information buffers $42_1$ to $42_4$ (see FIGS. 5(17) to 5(20)). Further, in the fifth to eighth cycles, the address generator circuit 33 generates four address values ADD0 to ADD3 from the value of a header address of a line belonging to the information INF1 having a value "0x . . . 0001" of the address signal AD, which is to be stored in the cache memory 31, by incrementing it every cycle on the basis of the value "0x . . . 0001" of the address signal AD supplied from the processor 21. The address values ADD0 to ADD3 are supplied to the cache memory 31 through the selector 43 as the address signal CAD. Further, the information INF0 to INF3 corresponding to these address values ADD0 to ADD3 are read out sequentially from the information buffers $42_1$ to $42_4$, supplied to the cache memory 31 through the selector 44 as the information signal CDT and stored therein (see FIG. 5(22)).

In the ninth cycle for the cache control, when an address signal AD having a value "0x . . . 0001" is supplied from the processor 21 again (see FIG. 5(7)), the buffer check state BFCH is activated again. Since, however, the cache fill state has been activated up to the eighth cycle in this case, a value "0x . . . 0000" of the header address of the line, to which the information of the value "0x . . . 0001" of the address signal AD belongs, is generated by the address generator circuit 33 in the cache fill state on the basis of the address signal AD having the value "0x . . . 0001" supplied from the processor 21 is temporarily stored in the backup buffer 39 at a time when the cache fill state ends (see FIG. 5(6)). Therefore, there is a hit in the comparator $34_{10}$ (see FIG. 5(3)). Thus, the cache memory control device 22 reads out the access-requested information INF1 directly from the information buffer $42_2$ and supplies it to the processor 21 through the selector 45 as the information signal DT in synchronism with the acknowledge signal AK (see FIG. 5(10)) indicative of the hit (see FIG. 5(11)). Since the tenth and eleventh cycles are the same as the ninth cycle except that the value of the address signal AD supplied from the processor 21 is updated by 1 (see FIG. 5(7)), details thereof are omitted. Further, since the third processing is the same as the ninth and eleventh cycles except that the information is read out from the cache memory 31 when the information is not stored in the information buffers $42_1$ to $42_4$, details thereof are omitted.

Now, the second processing will be described with reference to a timing chart shown in FIG. 6.

Figure 6:
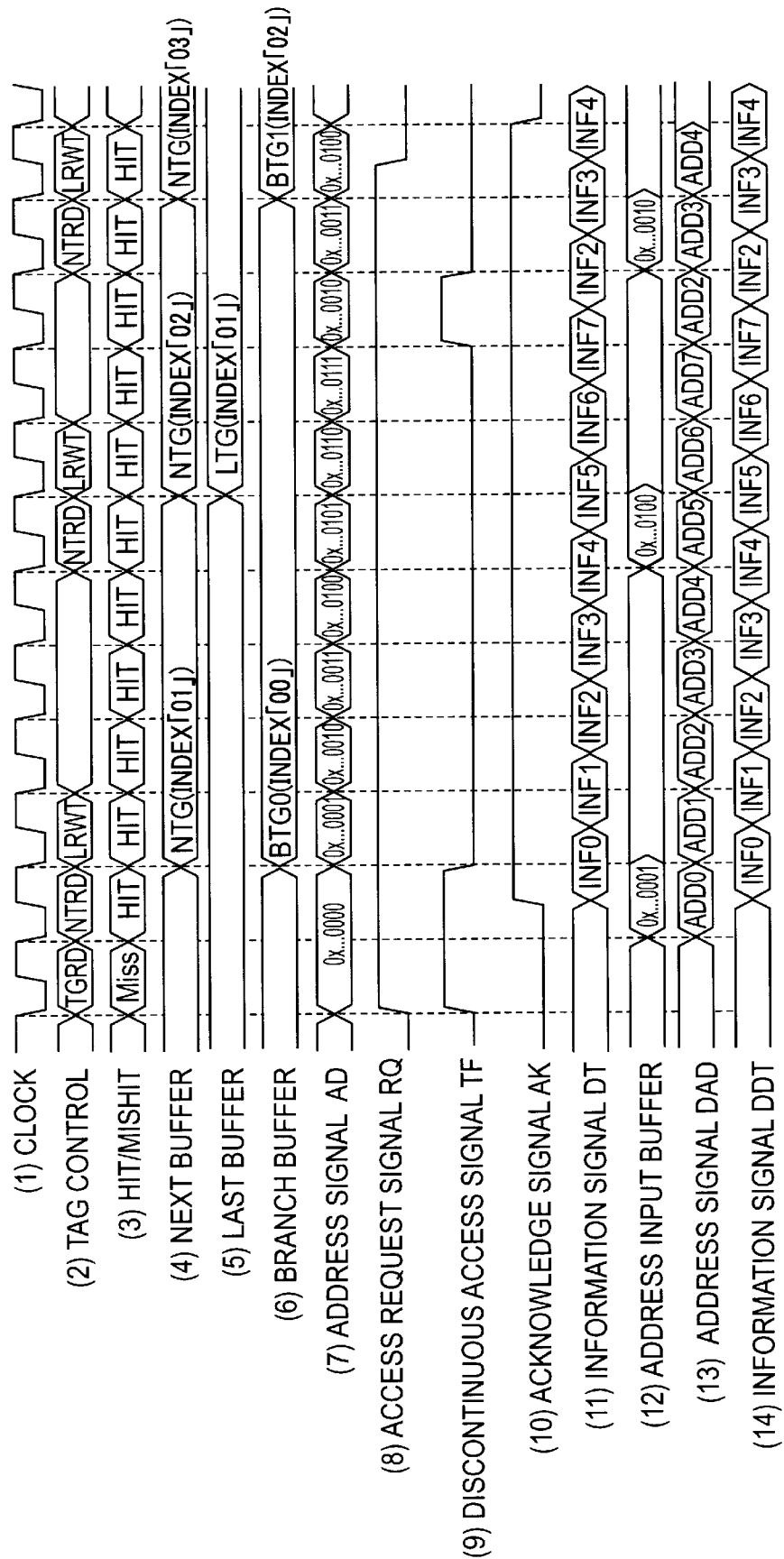
FIG. 6 is a timing chart for explaining a second processing performed in the cache memory control device shown in FIG. 1.

In the first cycle for the cache control, an address signal AD having a value "0x . . . 0000" is supplied from the processor 21 (see FIG. 6(7)) in synchronism with the access request signal RQ (see FIG. 6(8)). Since an access to an information stored in the memory region, which is discontinuous with respect to the information access-requested in the preceding cycle, is requested, an active discontinuous access signal TF indicative of the fact has been supplied from the processor 21 to the cache memory control device 22 (see FIG. 6(9)). Therefore, the buffer check state BFCH is activated. However, since it becomes mishit (see FIG. 6(3)), the tag read state TGRD is activated for the tag control (see FIG. 6(2)).

In the second to fifth cycles, the operation is shifted to the tag check state TGCH for the cache control. A tag corresponding to the address signal AD having a value "0x . . . 0000" is read out from the tag memories $32_1$ and $32_2$ and temporarily stored in the tag buffers $35_1$ and $35_2$ in the cache control. Therefore, there are hits in the comparators $34_1$ and $34_2$ (see FIG. 6(3)). Thus, when the address signal AD having a value incremented from "0x . . . 0000" by 1 every cycle is supplied from the processor 21 to the cache memory control device (see FIG. 6(7)), the address signals AD having such values directly become values ADD0 to ADD3 corresponding to 4 addresses of the information to be read out from the cache memory 31 (see FIG. 6(13)) and supplied to the cache memory 31 through the selector 43 as the address signal DAD (see FIG. 6(13)). Therefore, the information INF0 to INF3 corresponding to the respective address values ADD0 to ADD3 are read out sequentially from the cache memory 31 (see FIG. 6(14)) and the access-requested information INF0 to INF3 are sequentially supplied to the processor 21 as the information signal DT in synchronism with the acknowledge signal AK (see FIG. 6(10)) indicative of the hit (see FIG. 6(11)). Incidentally, in the third and subsequent cycles, for the cache control, the operation is shifted to the buffer check state BFCH. However, since the tag (index number "00") is temporarily stored in the branch buffer $37_1$ as the branch tag BTG in the third cycle, as to be described later (see FIG. 6(6)), there is a hit in the comparator $34_5$ (see FIG. 6(3)).

In the second cycle, for the tag control, the operation is shifted to the next tag read state NTRD (see FIG. 6(2)). In this case, the value "0x . . . 0000" of the address signal AD supplied from the processor 21 is temporarily stored in the address input buffer 40 (see FIG. 6(12)). In the third cycle, for the tag control, the operation is shifted from the next tag read state NTRD to the LRU information write state LRWT (see FIG. 6(2)). In this case, a tag of a line (index number "01") next to the line (index number "00") to which the information having address value "0x . . . 0000" belongs is temporarily stored in the next buffer $36_1$ or $36_2$ as the next tag NTG (see FIG. 6(4)) and a tag (index number "00") which is a portion of the current address signal AD temporarily stored in the address input buffer 40 is temporarily stored in the branch buffer $37_1$ as the branch tag BTG (see FIG. 6(6)) since the discontinuous access signal TF is active (see FIG. 6(9)).

Regarding to the cache control, the sixth to ninth cycles are the same as the third to fifth cycles except that the information sequentially read out from the cache memory 31 is information INF4 to INF7 constituting a line next to the line constituted by the INF0 to INF3 and the value of the address signal AD supplied from the processor 21 correspondingly thereto is updated by one every time. Therefore, detailed explanation thereof is omitted. In the seventh cycle, for the tag control, the operation is shifted to the next tag read state NTRD (see FIG. 6(2)). In this case, a value "0x . . . 0100" of the address signal AD supplied from the processor 21 is temporarily stored in the address input buffer 40 (see FIG. 6(12)). In the eighth cycle, for the tag control, the operation is shifted from the next tag read state NTRD to the LRU information write state LRWT (see FIG. 6(2)). In this case, a tag of a line (index number "02") next to the line (index number "01") to which the information having an address value "0x 0100" belongs is temporarily stored in the next buffer $36_1$ or $36_2$ as the next tag NTG (see FIG. 6(4)) and the tag (index number "01") which is a portion of the current address signal AD temporarily stored in the address input buffer 40 is temporarily stored in the last buffer 38 as the last tag LTG (see FIG. 6(5)) since the discontinuous access signal TF is not active (see FIG. 6(9)).

In the tenth cycle, an address signal AD having a value "0x . . . 0010" is supplied from the processor 21 to the cache memory control device 22 (see FIG. 6(7)). Since the value "0x . . . 0010" of this address signal AD is discontinuous with respect to the value "0x 0111" of the address signal AD supplied in the ninth cycle, an active discontinuous access signal TF indicative of the fact is supplied from the processor 21 to the cache memory control device 22 (see FIG. 6(9)). Since, in the cache control, the tag (index number "00") is temporarily stored in the branch buffer $37_1$ as the branch tag BTG0 in the third cycle (see FIG. 6(6)), there is a hit in the comparator $34_5$ (see FIG. 6(3)). Since other processing than this is the same as that subsequent to the third cycle, details thereof are omitted.

Regarding to the cache control, the processing in the eleventh and twelfth cycles is similar to that in the above mentioned tenth cycle. Regarding to the tag control, the operation is shifted to the next tag read state NTRD (see FIG. 6(2)) in the eleventh cycle, the index value "01" of the current address signal AD stored temporarily in the address input buffer 40 is incremented by +1 by the incrementer 47 to provide a new address and a new tag (index number "02") is read out from the tag memories $32_1$ and $32_2$ on the basis of the new address. Since, however, the tag having index number "02" is temporarily stored currently in the next buffer $36_1$ or $36_2$ as the next tag NTG (see FIG. 6(4)), the index value "02" of the current next tag NTG is incremented by +1 by the incrementer 47 to provide a new address and a new tag (index number "03") is read out from the tag memories $32_1$ and $32_2$ on the basis of the new address. In this case, the value "0x . . . 0010" of the address signal AD supplied from the processor 21 is temporarily stored in the address input buffer 40 (see FIG. 6(12)). Further, in the twelfth cycle, the operation is shifted to the LRU information write state LRWT (see FIG. 6(2)). In this case, a tag having index number "03" read out from the tag memories $32_1$ and $32_2$ in the eleventh cycle is temporarily stored in the next buffers $36_1$ and $36_2$ as the next tag NTG (see FIG. 6(4)) and a tag (index number "00") which is a portion of the current address signal AD temporarily stored in the address input buffer 40 is temporarily stored in the branch buffer $37_2$ as the branch tag BTG1 (see FIG. 6(6)) since the active discontinuous access signal TF is supplied in the tenth cycle (see FIG. 6(9)).

As described, according to this embodiment, the cache control and the tag control can be processed independently in parallel. Therefore, it is possible to process the response to the access request from the processor 21 at higher speed compared with the conventional case. Particularly, in the third processing, that is, when there are successive hits, it becomes possible to supply information corresponding to an access request from the processor 21 within one clock as shown by the ninth to eleventh cycles shown in FIG. 5, resulting in the response processing at higher speed.

Further, according to this embodiment, in the case of mishit, the cache memory 31 is not accessed till cache fill. Therefore, it is possible to reduce power consumption compared with the conventional system in which the cache memory is accessed regardless of hit or mishit. Particularly, the information acquired from the main memory device 25 is temporarily stored in the information buffers $42_1$ to $42_4$ immediately after the cache fill. Therefore, a desired information is directly supplied from the information buffers $42_1$ to $42_4$, to the processor 21 without access to the cache memory 31, so that power consumption can be reduced correspondingly thereto and the response speed can be increased.

Further, according to this embodiment, tags and/or addresses the possibility of access request to which is high are preliminarily stored in the respective buffers $35_1$, $35_2$, $36_1$, $36_2$, $37_1$ to $37_4$, and 38 to 40. Therefore, it is possible to reduce the number of accesses to the tag memories $35_1$ and $35_2$ correspondingly thereto to thereby reduce power consumption and increase the response speed.

Further, according to this embodiment, the branch buffers $37_1$ to $37_4$ are provided so that tags are held therein in the case of discontinuous access. Therefore, it is possible to reduce the probability of mishit and to reduce the number of accesses to the tag memories $35_1$ and $35_2$, correspondingly. Thus, it is possible to reduce power consumption and to increase the response speed.

Figures 7, 8:
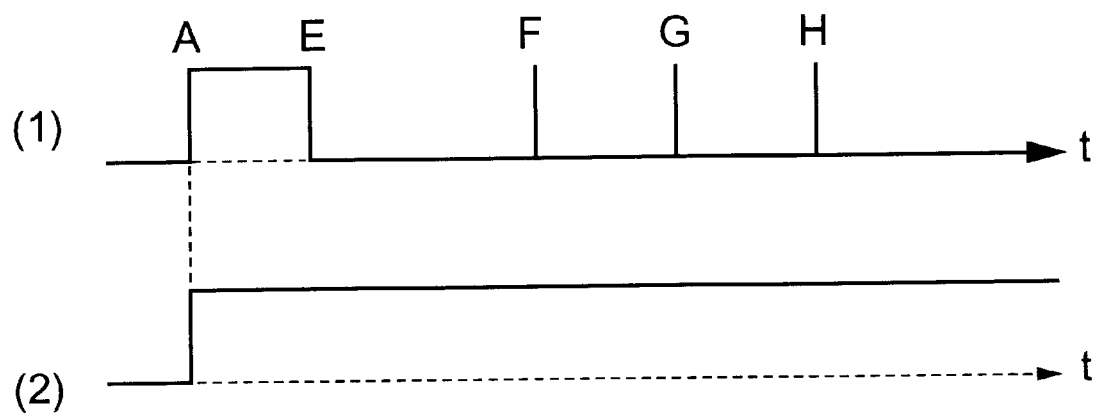
FIG. 7 shows an example of a portion of a program applied to the cache memory control device shown in FIG. 1.
FIG. 8 shows power consumption characteristics of the data processing unit when the cache memory control device shown in FIG. 1 and a conventional cache memory control device are used, respectively.
Figure 9:
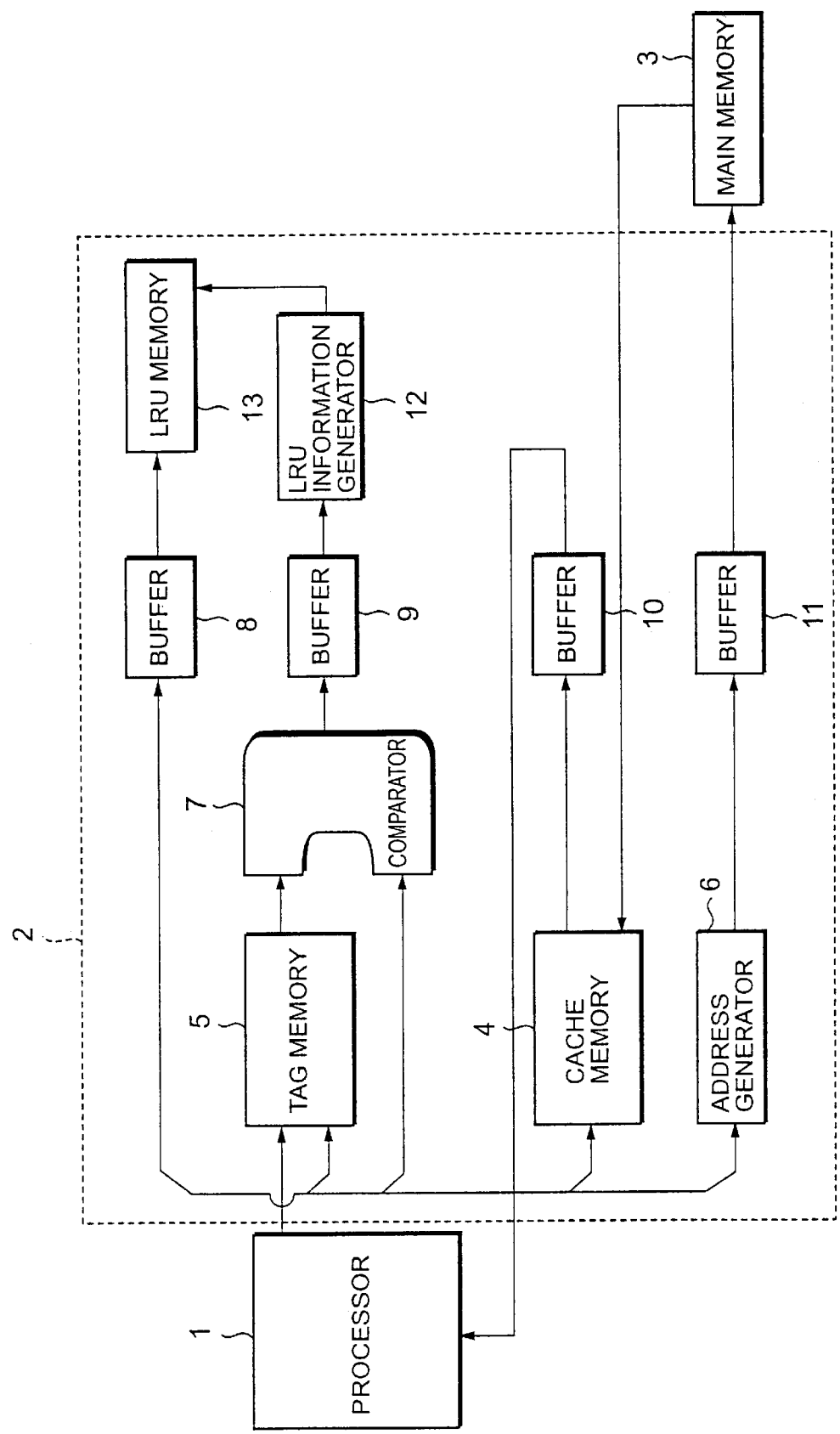
FIG. 9 is a block circuit diagram showing an electrical construction of a main portion of the conventional cache memory control device.

FIG. 7 shows a portion of a program having a multiple loop, as an example of the discontinuous access. In FIG. 7, the program has a quadruple loop. If there is an access request from the processor 21 in a state where the cache memory 31 does not store any information about the program, instruction codes A to E have to be cache-filled. Therefore, the tag memories $35_1$ and $35_2$, are continuously accessed, so that power consumption is large. As to the instruction code E, however, the tag memories $35_1$ and $35_1$ are not accessed during a time for which the loops from the instruction code D to the instruction code E are processed and there is no power consumption, provided that a corresponding tag is held in the branch buffer $37_1$ (see FIG. 8(1)). Similarly, as to the instruction codes F to H, the tag memories $35_1$ and $35_2$ are accessed for initial processing times of the respective loops with power consumption, while these tag memories are not accessed during other time and there is no power consumption, provided that corresponding tags are held in the branch buffers $37_1$ to $37_4$ (see FIG. 8(1)). Contrary to this, since in the conventional system, there is no measure provided for the discontinuous access, the tag memories are continuously accessed and power is continuously consumed (see FIG. 8(2)).

Although the embodiment of the present invention has been described in detail with reference to the drawings, the construction of the present invention is not limited thereto and various modifications thereof can be made within the scope of the present invention defined in the appended claims.

For example, although the set associative method in which the main memory and the cache memory are divided to the same number of groups called sets, respectively, and a mapping is allowed between the same sets of the main memory and the cache memory is employed in the described embodiment, the direct map index method which is the set associative method with the same number being one or the sector method in which the main memory and the cache memory are divided to sectors having logically fixed length, respectively, and a mapping is performed associatively between sectors of the main memory and corresponding sectors of the cache memory may be employed.

Further, although, in the described embodiment, the cache memory 31 has the construction including two ways, 4 words per line and 256 entries per way as shown in FIG. 3, the number of ways, the number of words per line and the number of entries per way can be set arbitrarily. In such case, the numbers of the tag buffers, the next buffers, the branch buffers, the last buffers and the backup buffers can be, of course, determined correspondingly to the numbers of the ways, the words per line and the entries per way.

Further, in the described embodiment, the cache memory 31 stores both the instructions and data, that is, the information, temporarily. However, it is possible to separately provide an instruction cache memory for storing only instructions and an information cache memory for storing only data.

Further, in the described embodiment, the addresses and tags temporarily stored in the next buffers $36_1$ and $36_2$, the branch buffers $37_1$ to $37_4$, the last buffer 38 and the backup buffer 39 are compared, by the comparators $34_1$ with the address signal AD supplied from the processor 21 and a tag which is a portion thereof in the buffer check state BFCH, to determine whether or not a hit information is output from any of the comparators 34. Since, however, the tags are temporarily stored in the tag buffers $35_1$ and $35_2$, it is possible to determine whether or not a hit information is output, by comparing the tags in the tag buffers with the tag which is a portion of the address signal AD supplied from the processor 21.

Further, in the tag control in the described embodiment, it is possible to copy the tags stored in the tag memories $32_1$ and $32_2$ in the next buffers $36_1$ and $36_2$, the branch buffers $37_1$ to $37_4$, the last buffer 38 and the backup buffer 39. In such case, the probability of hit is increased, so that it is possible to increase the response speed to the access request from the processor 21.

As described hereinbefore, according to the present invention, it is possible to immediately respond to the access request from the processor, with reduced power consumption.

Therefore, it is possible to reduce the cost and size of the data processing device to which the cache memory control device of the present invention is applied.

What is claimed is:

1. A cache memory control method for reading information requested by a processor from a cache memory or a main memory of a data processing device and supplying the information to said processor, said data processing device including tag memories for storing tags constituting addresses corresponding to information stored in said cache memory, a first buffer for temporarily storing a tag read out from said tag memories, a second buffer for temporarily storing an information read out from said main memory and a third buffer for temporarily storing an address of an information temporarily stored in said second buffer, said cache memory control method comprising the steps of:

a first step of reading the information from said cache memory or said second buffer and supplying the information to said processor when an address supplied from said processor and corresponding to the information requested by said processor or a tag constituting the address is coincident with an address temporarily stored in said third buffer or a tag temporarily stored in said first buffer, or reading the tag constituting the address supplied from said processor from said tag memories and temporarily storing the tag in said first buffer when the address supplied from said processor and corresponding to the information requested by said processor or the tag constituting the address is not coincident with the address temporarily stored in said third buffer or the tag temporarily stored in said first buffer; and a second step of reading the information from said cache memory and supplying the information to said processor when the tag constituting the address supplied from said processor is coincident with the tag temporarily stored in said first buffer or reading the information from said main memory on the basis of the address supplied from said processor, temporarily storing the information in said second buffer and in said cache memory and temporarily storing addresses temporarily stored in said third and second buffers when the tag constituting the address supplied from said processor is not coincident with the tag temporarily stored in said first buffer.

2. A cache memory control method as claimed in claim 1, wherein said data processing device further includes a fourth buffer for temporarily storing a tag of an information predicted as to be requested next by said processor and read out from said tag memories, said cache memory control method further comprising:

a third step of reading the tag of the information predicted as to be requested next by said processor from said tag memories and temporarily storing the tag in said fourth buffer, wherein, in the first steps, one of the address temporarily stored in said third buffer and the tags temporarily stored in said first and fourth buffers is determined as being coincident with the address supplied from said processor or the tag constituting the address.

3. A cache memory control method for reading an information requested by a processor from a cache memory or a main memory of a data processing device and supplying the information to said processor, said data processing device including tag memories for storing tags constituting addresses corresponding to information stored in said cache memory a tag buffer for temporarily storing a tag read out from said tag memories, an information buffer for temporarily storing an information read out from said main memory a backup buffer for temporarily storing an address of the information temporarily stored in said information buffer, a last buffer for temporarily storing a newest tag, a next buffer storing a tag information read out from an address of said tag memory that is next to an address of said tag memory storing the tag information corresponding to the access address of a previous access request issued by said processor and a branch buffer for temporarily storing a tag constituting an address of an information temporarily stored in a discontinuous memory region of said main memory when the information is requested by said processor, said cache memory control method comprising the steps of:

a first step of reading the information from said cache memory or said information buffer and supplying the information to said processor when an address supplied from said processor or a tag constituting the address is coincident with an address temporarily stored in said backup buffer or a tag temporarily stored in said last buffer, said next buffer or said branch buffer;

a second step of reading the information from said cache memory and supplying the information to said processor when the tag constituting the address supplied from said processor is coincident with the tag temporarily stored in said tag buffer;

a third step of reading the information from said main memory on the basis of the address supplied from said processor, temporarily storing the information in said information buffer and in said cache memory and temporarily storing addresses of the information temporarily stored in said information buffer in said backup buffer;

a fourth step of reading the tag constituting the address supplied from said processor from said tag memories and temporarily storing the tag in said tag buffer; and a fifth step of reading the tag information from an address of said tag memory that is next to an address of said tag memory storing the tag information corresponding to the access address of a previous access request issued by said processor, and temporarily storing the tag information to the next buffer, and temporarily storing the tag constituting the address corresponding to the information in said branch buffer when the information stored in said discontinuous memory region of said main memory is requested by said processor, and temporarily storing the information in said last buffer when the information stored in said discontinuous memory region of said main memory is not requested by said processor.

4. A cache memory control method as claimed in claim 3, wherein the first, second and third steps are performed in parallel, the fourth and fifth steps are performed in parallel, and the first, second and third steps and the fourth and fifth steps are performed independently.

5. A cache memory control method as claimed in claim 3, wherein said cache memory is composed of a plurality of ways each composed of a plurality of entries for storing a plurality of information, wherein, in the third step, all information constituting said entries to which the information belong are read out from said main memory and temporarily stored in the plurality of said information buffers.

6. A cache memory control device for reading an information requested by a processor from a cache memory or a main memory of a data processing device and supplying the information to said processor, comprising:

tag memories for storing tags constituting addresses corresponding to information stored in said cache memory;

a first buffer for temporarily storing a tag read out from said tag memories;

a second buffer for temporarily storing an information read out from said main memory;

a third buffer for temporarily storing an address of an information temporarily stored in said second buffer;

a first comparator for comparing a tag constituting an address supplied from said processor and corresponding to an information requested by said processor with a tag temporarily stored in said first buffer and outputting a hit signal when the tags are coincident;

a second comparator for comparing the address supplied from said processor with the address temporarily stored in said third buffer and outputting a hit signal when the addresses are coincident, wherein the information is read out from said cache memory or said second buffer and supplied to said processor when either said first or second comparator outputs a hit signal, the tag constituting the address supplied from said processor is read out from said tag memory and temporarily stored in said first buffer when neither said first nor second comparator outputs a hit signal, the information read out from said cache memory and supplied to said processor when said first comparator outputs the hit signal, or the information is read out from said main memory on the basis of the address supplied from said processor and temporarily stored in said second buffer and said cache memory and the address of the information temporarily stored in said second buffer is temporarily stored in said third buffer when said first comparator outputs no hit signal.

7. A cache memory control device as claimed in claim 6, further comprising a fourth buffer for temporarily storing a tag of an information predicted as to be requested next by said processor and read out from said tag memories; and a third comparator for comparing the tag constituting the address supplied from said processor with the tag temporarily stored in said fourth buffer and outputting a hit signal when the tags are coincident, wherein the information is read out from said cache memory or said second buffer and supplied to said processor when said first to third comparators output the hit signals, the tag constituting the address supplied from said processor is read out from said tag memory and temporarily stored in said first buffer and a tag of an information predicted as to be requested next by said processor is read out from said tag memory and temporarily stored in said fourth buffer when said first to third comparators outputs no hit signal, the information is read out from said cache memory and supplied to said processor when said first comparator outputs the hit signal, or the information is read out from said main memory on the basis of the address supplied from said processor and temporarily stored in said second buffer and said cache memory and the address of the information temporarily stored in said second buffer is temporarily stored in said third buffer when said first comparator outputs no hit signal.

8. A cache memory control device for reading an information requested by a processor from a cache memory or a main memory of a data processing device and supplying the information to said processor, comprising:

tag memories for storing tags constituting addresses corresponding to information stored in said cache memory;

a tag buffer for temporarily storing a tag read out from said tag memories;

an information buffer for temporarily storing an information read out from said main memory;

a backup buffer for temporarily storing an address of an information temporarily stored in said information buffer;

a last buffer for temporarily storing a newest tag;

a next buffer storing a tag information read out from an address of said tag memory that is next to an address of said tag memory storing the tag information corresponding to the access address of a previous access request issued by said processor;

a branch buffer for temporarily storing a tag constituting an address of an information temporarily stored in a discontinuous memory region of said main memory when the information is requested by said processor;

a first, second, third and fourth comparators each for comparing a tag constituting an address supplied from said processor and corresponding to an information requested by said processor with a tag temporarily stored in different one of said tag buffer, said last buffer, said next buffer and said branch buffer and outputting a hit signal when the tags are coincident; and a fifth comparator for comparing the address supplied from said processor with the address temporarily stored in said backup buffer and outputting a hit signal when the addresses are coincident, wherein said cache memory control device takes in:

a first state in which, when said second to fifth comparators output the hit signals, the information is read out from said cache memory or said information buffer and supplied to said processor;

a second state in which, when said first comparator outputs the hit signal, the information is read out from said cache memory and supplied to said processor;

a third state in which the information is read out from said main memory on the basis of the address supplied from said processor, temporarily storing the information in said information buffer and in said cache memory and addresses of the information temporarily stored in said information buffer are temporarily stored in said backup buffer;

a fourth state in which the tag constituting the address supplied from said processor is read out from said tag memories and temporarily stored in said tag buffer; and a fifth state in which the tag information from an address of said tag memory that is next to an address of said tag memory storing the tag information corresponding to the access address of a previous access request issued by said processor, and temporarily storing the tag information to the next buffer, and, when the information stored in said discontinuous memory region of said main memory is requested by said processor, the tag constituting the address corresponding to the information is temporarily stored in said branch buffer and, otherwise, the tag constituting the address corresponding to the information is temporarily stored in said last buffer.

9. A cache memory control device as claimed in claim 8, wherein the first to third states are performed in parallel, the fourth and fifth states are performed in parallel, and the first, second and third states and the fourth and fifth states are performed independently.

10. A cache memory control device as claimed in claim 8 wherein said cache memory is composed of a plurality of ways each composed of a plurality of entries for storing a plurality of information, wherein said next buffer, said tag buffer and said first and third comparators are provided for each way, respectively, said information buffer is provided for each of information stored in each of said entries, and a predetermined number of said branch buffers and a predetermined number of said fourth comparators are provided, and, in the third state, all information constituting said entries to which the information belong are read out from said main memory and temporarily stored in the plurality of said information buffers.

11. A cache memory control device employed in a data processing system which includes a processor and a main memory, said processor issuing an access request with an access address and said main memory storing information to be accessed and processed by said processor, said cache memory control device comprising:

a cache memory temporarily storing data that are copied from said main memory, a tag memory associated with said cache memory to temporarily store tags, each of said tags accompanying a corresponding one of the data stored in said cache memory, a tag memory control circuit responding to said access address to read out one of said tags from said tag memory, and a first comparator comparing said one of said tags read out from said tag memory with a portion of said access address to produce either a first hit signal or a first miss-hit signal, said first hit signal causing a first operation in which one of said data stored in said cache memory is read out from said cache memory and fed to said processor, and said first miss-hit signal causing a second operation in which the information stored in said main memory is read out from said main memory and fed to said processor, said cache memory control device further comprising:
at least one buffer that temporarily stores one of said tags which is copied from said tag memory, and at least one second comparator that compares the tag stored in said buffer with a part of said access address before said tag memory is accessed by said tag memory control circuit in response to said access request, said second comparator producing when the tag stored in said buffer is coincident with said part of said access address, a second hit signal that causes said first operation.

12. The device as claimed in claim 11, wherein said buffer includes a next buffer which temporarily stores, as said address information, the tag information read out from an address of said tag memory that is next to an address of said tag memory storing the tag information corresponding to the access address of a first access request issued by said processor, and at least one of said second comparator compares said tag information corresponding to said first access request stored in said next buffer with the tag information corresponding to an tag address portion of a second access following to said first request issued by said processor and information stored in said cache memory is read out therefrom an fed to said processor when at least one of said second comparator produces said second hit signal in response to a fact that the tag information stored in said next buffer with said tag address portion of said second access issued by said processor.

13. The device as claimed in claim 11, wherein said processor issued a discontinuous access with a discontinuous access address and a discontinuous access signal (TF) indicating that an address to be accessed is discontinuous to an access address of a first access request and that said buffer includes at least one branch buffer which responds to said discontinuous access signal to temporarily store, as said address information, the tag address portion of said discontinuous access address, and at least one of said second comparator compares said tag information corresponding to said first access request stored in said branch buffer with the tag information corresponding to an tag address portion of a second access following to said first request issued by said processor and information stored in said cache memory is read out therefrom an fed to said processor when at least one of said second comparator produces said second hit signal in response to a fact that the tag information stored in said branch buffer with said tag address portion of said second access issued by said processor.

14. The device as claimed in claim 11, wherein said buffer includes a last buffer which temporarily stores, as said address information, the tag address portion of a first access request that is currently issued by said processor.

15. The device as claimed in claim 14, wherein said when said processor issues a second access request following to said first access request with the access address said second comparator produces said second hit signal so that information stored in said cache memory is read out therefrom and fed to said processor.

16. The device as claimed in claim 11, wherein the information fed from said main memory to said processor in response to said first miss-hit signal is also stored in said cache memory, characterized in that said cache memory control circuit further comprises at least one information buffer which is provided separately from said cache memory to temporarily store the information fed from said main memory to said processor in response to said first miss-hit signal and that said buffer includes a backup buffer which temporarily stores, as said address information, the address information designating the information fed from said main memory to said processor in response to said first miss-hit signal.

17. The device as claimed in claim 16, wherein when said processor issued again such an access request that causes the production of said first miss-hit signal, said second comparator produces said second hit signal in response to the address information stored in said backup buffer so that the information stored in said information buffer is fed to said processor.

* * * * *